United States Patent
Kuo

(12) 
(10) Patent No.: US 9,094,976 B2
(45) Date of Patent: Jul. 28, 2015

(54) METHOD AND RELATED APPARATUS FOR ENHANCING RESOURCE UTILITY RATE IN A WIRELESS COMMUNICATIONS SYSTEM

(75) Inventor: Richard Lee-Chee Kuo, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 979 days.

(21) Appl. No.: 12/043,968

(22) Filed: Mar. 7, 2008

(65) Prior Publication Data

US 2008/0220789 A1 Sep. 11, 2008

Related U.S. Application Data

(60) Provisional application No. 60/893,859, filed on Mar. 8, 2007.

(51) Int. Cl.
*H04Q 7/20* (2006.01)
*H04W 76/04* (2009.01)

(52) U.S. Cl.
CPC .............. *H04W 76/046* (2013.01); *Y02B 60/50* (2013.01)

(58) Field of Classification Search
CPC ............................ H04W 76/046; H04W 4/00
USPC ......... 370/328, 310, 329, 335, 352, 331, 338, 370/342, 216; 455/450, 434, 522, 517, 455/412.1, 412.2, 574, 418, 101
See application file for complete search history.

(56) References Cited

U.S. PATENT DOCUMENTS

| | | | | |
|---|---|---|---|---|
| 7,089,029 B2 * | 8/2006 | Cao et al. | | 455/522 |
| 7,155,261 B2 * | 12/2006 | Chen | | 455/574 |
| 7,539,160 B2 * | 5/2009 | Virtanen et al. | | 370/329 |
| 7,684,788 B2 * | 3/2010 | Farnsworth | | 455/412.1 |
| 7,792,079 B2 * | 9/2010 | Choi et al. | | 370/331 |
| 7,848,279 B2 * | 12/2010 | Ranta-aho et al. | | 370/328 |
| 7,929,921 B2 * | 4/2011 | Love et al. | | 455/101 |
| 2005/0070252 A1 * | 3/2005 | Farnsworth | | 455/412.1 |
| 2005/0141471 A1 * | 6/2005 | Virtanen et al. | | 370/342 |
| 2007/0135113 A1 * | 6/2007 | Moinet et al. | | 455/418 |
| 2008/0002618 A1 * | 1/2008 | Murata et al. | | 370/329 |

(Continued)

FOREIGN PATENT DOCUMENTS

| | | | | |
|---|---|---|---|---|
| CN | 1960562 A | * | 5/2007 | ............... H04Q 7/38 |
| KR | 20030028237 A | | 4/2003 | |

(Continued)

OTHER PUBLICATIONS

R2-070405 3GPP TSG-RAN WG2 Meeting #56bis, "Stage 2 updates for Enhanced CELL_FACH state in FDD", Jan. 2007.

(Continued)

*Primary Examiner* — Khaled Kassim
*Assistant Examiner* — Parth Patel
(74) *Attorney, Agent, or Firm* — Blue Capital Law Firm, P.C.

(57) ABSTRACT

In order to reduce power and computing resource consumption in a user equipment of a wireless communications system, a method for enhancing a resource utility rate for the user equipment is provided. The method includes stopping receiving data and control signals through a first common channel and a second common channel and clearing configuration corresponding to the first and second common channels when the user equipment receives a connection setup message configuring the user equipment to enter a CELL_DCH state.

2 Claims, 3 Drawing Sheets

(56) References Cited

U.S. PATENT DOCUMENTS

| | | | |
|---|---|---|---|
| 2008/0049682 A1* | 2/2008 | Ding et al. | 370/335 |
| 2008/0089285 A1* | 4/2008 | Pirskanen et al. | 370/329 |
| 2008/0182594 A1* | 7/2008 | Flore et al. | 455/458 |
| 2008/0198796 A1* | 8/2008 | Jen | 370/328 |
| 2008/0267061 A1* | 10/2008 | DiGirolamo et al. | 370/216 |
| 2010/0142456 A1* | 6/2010 | Lee et al. | 370/329 |

FOREIGN PATENT DOCUMENTS

| | | |
|---|---|---|
| KR | 1020040028063 A | 4/2004 |
| WO | 0245456 A1 | 6/2002 |

OTHER PUBLICATIONS

R2-070508 3GPP TSG-RAN WG2 Meeting #57, "Introduction of Enhanced CELL_FACH state 25.331", Feb. 2007.

R2-0701011 3GPP TSG-RAN WG2 Meeting #57, "Introduction of HS-DSCH operation in CELL_FACH state", Feb. 2007.

3GPP: "3rd Generation Partnership Project; Technical Specification Group Radio Access Network; Radio Resource Control (RRC) protocol specification (Release 7)", 3GPP TS 25.331 V7.3.0, Dec. 2006, XP002551010.

* cited by examiner

METHOD AND RELATED APPARATUS FOR ENHANCING RESOURCE UTILITY RATE IN A WIRELESS COMMUNICATIONS SYSTEM

CROSS REFERENCE TO RELATED APPLICATIONS

This application claims the benefit of U.S. Provisional Application No. 60/893,859, filed on Mar. 8, 2007 and entitled "Method And Apparatus for Stopping HS-DSCH Reception in CELL_FACH State in a Wireless Communication System", the contents of which are incorporated herein by reference.

BACKGROUND OF THE INVENTION

1. Field of the Invention

The present invention relates to a method for enhancing a resource utility rate for a wireless communications system and related communications device, and more particularly to a method of managing a high-speed downlink operation to enhance a resource utility rate for a wireless communications system and related communications device.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the 3rd Generation Partnership Project (3GPP) provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate.

For an HSDPA UE, physical channels include a high speed physical downlink shared channel (HS-PDSCH), for transferring payload data, and a high speed physical control channel (HS-DPCCH) for uploading an acknowledgement/negative acknowledgement (ACK/NACK) and a channel quality identifier (CQI). As for the media access control (MAC) layer of the HSDPA UE, a MAC-hs entity utilizes a transport channel of High Speed Downlink Shared Channel (HS-DSCH) for receiving data from the physical layer. In addition, a shared control channel for HS-DSCH (HS-SCCH) is used as a physical downlink channel, responsible for transmission of control signals, such as demodulation information, corresponding to HS-DSCH.

Besides the CELL_DCH state, a similar high speed downlink reception operation is also provided in CELL_FACH, allowing the UE in CELL_FACH to monitor HS-DSCH for data reception to improve a peak data rate, a signaling delay, a state transition delay, download times and flexible cell capacity. This high speed downlink reception operation is hereinafter called HS-DSCH reception in the CELL_FACH state. A UMTS radio access network (UTRAN) enables the HS-DSCH reception in the CELL_FACH state by including the parameters, related to radio resource control (RRC) configuration of HS-SCCH, HS-DSCH and a common H-RNTI, in the system information broadcast. In addition, the UTRAN may reconfigure an H-RNTI variable in the UE by dedicated RRC signaling.

For the HS-DSCH reception in the CELL_FACH state, the basic downlink channel configuration consists of one or several HS-PDSCHs along with a number of separate HS-SCCHs. Since there is no dedicated channel in the CELL_FACH state, no HS-DPCCH will be used for uplink signaling. HS-DSCH-related uplink ACK/NACK signaling is not supported. The MAC-hs can perform retransmission without uplink signaling. The measurement result on a random access channel (RACH) used for uplink transmission at the UE side can be used for link adaptation.

For enabling the HS-DSCH reception in CELL_FACH state, the RRC specification specifies that the UE shall start to receive HS-SCCH(s) and HS-DSCH with the common H-RNTI after sending an RRC CONNECTION REQUEST message to the UTRAN during an RRC connection establishment procedure. The common H-RNTI is selected from a list of candidate common H-RNTIs according to a formula "A" as follows:

A: Index of selected Common H-RNTI=Initial UE Identity mod K, where K is equal to the number of candidate Common H-RNTIs, and "Initial UE Identity" represents an identity of an UE included in the RRC CONNECTION REQUEST message. For example, if K is equal to 4, Index of selected Common H-RNTI could be 0, 1, 2 or 3. In this way, the UTRAN can group the UEs in the same cell with different values of the common H-RNTIs for transport channel allocation. Thus, all UEs in the same cell do not use the same radio resources to receive packets.

The UTRAN responds to the RRC CONNECTION REQUEST message with an RRC CONECTION SETUP message indicating the UE CELL_DCH or CELL_FACH state to be entered. In the RRC specification, the UE reselects an index of selected Common H-RNTI when entering the CELL_FACH state according to a formula "B" as follows:

B: Index of selected Common H-RNTI=U-RNTI mod K, where U-RNTI is included in the RRC CONECTION SETUP message and is received by the UE after the UE enters the CELL_FACH state.

Obviously, the formulas "A" and "B" use different parameters to generate the index of selected Common H-RNTI. The UE obtains the common H-RNTI based on the formula "A" when sending the RRC CONECTION REQUEST message. This reveals that the UE uses the formula "A" in idle mode. On the other hand, the UE reselects the common H-RNTI based on the formula "B" after receiving the RRC CONECTION SETUP message. This reveals that the UE uses the formula "B" in the CELL_FACH state.

In addition, the UE determines whether to perform the HS-DSCH reception in the CELL_FACH state or not by determining an HS_DSCH_RECEPTION_CELL_FACH_STATE variable. For performing determination of the variable, the UE must have selected the common H-RNTI based on the formula "B" and already been in the CELL_FACH state. In other words, the HS_DSCH_RECEPTION_CELL_FACH_STATE variable is only applied to the situation where the common H-RNTI is selected based on the formula "B".

When the RRC connection procedure is accomplished, the UTRAN may configure the UE to enter the CELL_DCH state without allocating HS_DSCH. Besides, the UE has selected a common H-RNTI to use based on the formula "A" before entering the CELL_DCH state. As can be seen from the above, this means that the UE has no chance to determine the HS_DSCH_RECEPTION_CELL_FACH_STATE variable for stopping the HS-DSCH reception in the CELL_FACH state. As a result, the UE keeps monitoring HS-DSCH and HS-SCCH according to the common H-RNTI after entering the CELL_DCH state. However, the UTRAN does not configure HS-DSCH with the parameters used before the UE enters the CELL_DCH state. Therefore, continued monitoring of HS-DSCH by the UE only results in a waste of the UE power.

Even though the UE is indicated to enter the CELL_DCH with HS_DSCH, the UE needs to stop using the parameters received from the SIBs type 5/5bis or 6, and then uses new parameters via dedicated RRC signaling to monitor HS-DSCH and HS-SCCH.

SUMMARY OF THE INVENTION

The present invention therefore provides a method for a UE of a wireless communications system and related communications device that ensures the UE stops the HS-DSCH reception in the CELL_FACH state after entering the CELL_DCH state for enhancing a resource utility rate.

The present invention discloses a method for enhancing a resource utility rate for a UE of a wireless communications system. The method includes stopping receiving data and control signals via a first common channel and a second common channel and clearing configuration corresponding to the first common channel and the second common channel when a connection setup message for configuring the UE to enter a CELL_DCH state is received.

The present invention further discloses a communications device of a wireless communications system for enhancing a resource utility rate. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes stopping receiving data and control signals via a first common channel and a second common channel and clearing configuration corresponding to the first common channel and the second common channel when a connection setup message for configuring the communications device to enter a CELL_DCH state is received.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
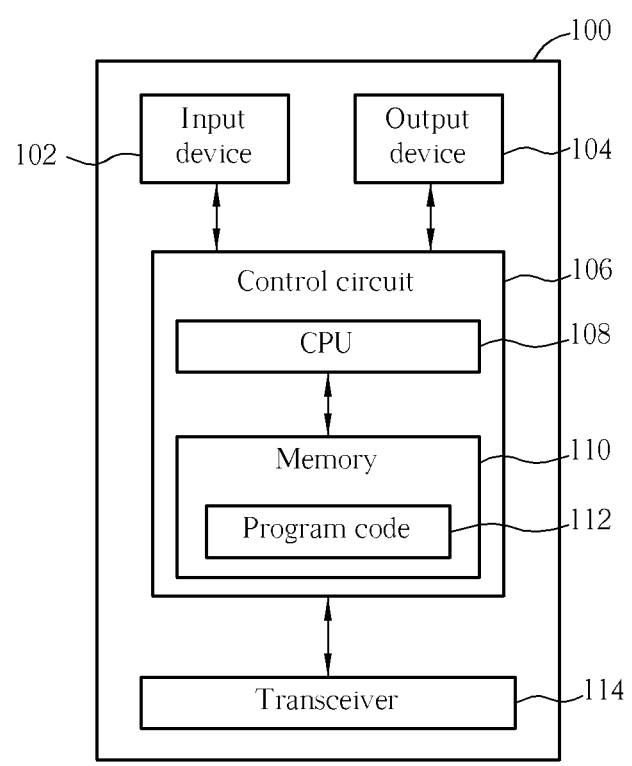
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system supporting the HS-DSCH reception in the CELL_FACH state.

Figure 2:
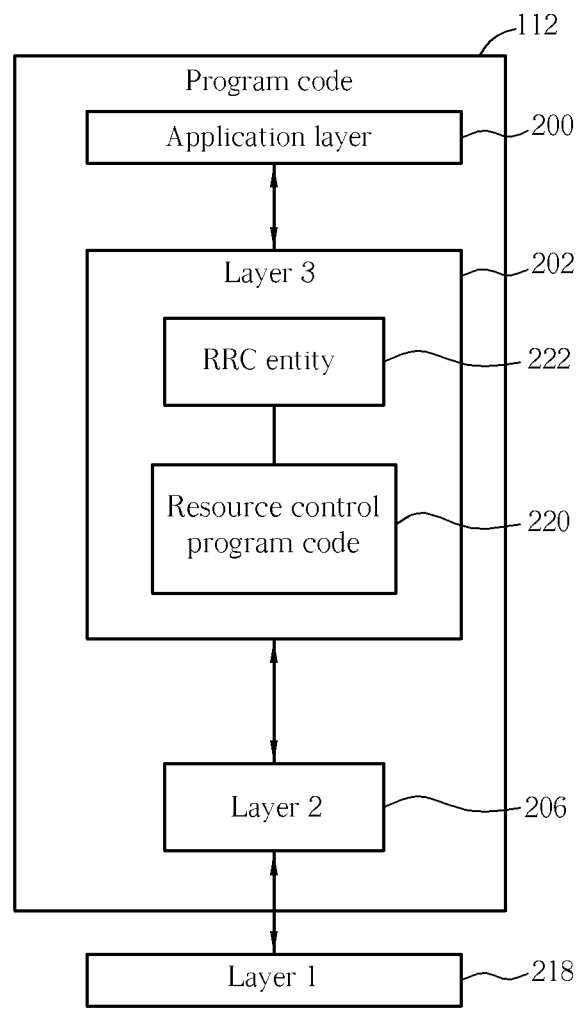
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222 for controlling the Layer 1 218 and the Layer 2 206 and performing peer-to-peer communication with a network terminal, such as a Node-B or a UTRAN. In addition, the RRC entity 222 can switch the communications device 100 among the idle mode, CELL_PCH, URA_PCH, CELL_FACH and CELL_DCH states.

As described above, the UTRAN does not configure HS-DSCH with parameters used for the UE in idle mode when the UE enters the CELL_DCH state. In this situation, the embodiment of the present invention provides a resource control program code 220 in the Layer 3 202 to prevent the UE from continuing to monitor HS-DSCH after entering an RRC state without an HS-DSCH reception allocation, so as to enhance a resource utility rate.

Figure 3:
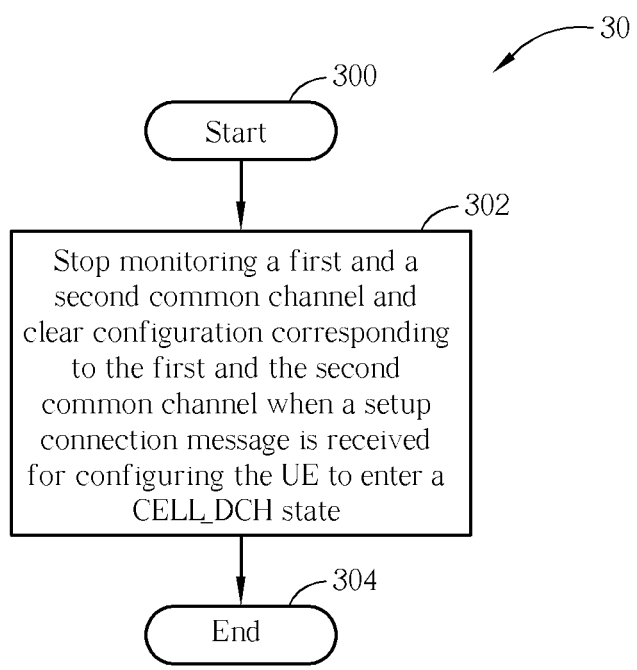
FIG. 3 is a flowchart diagram of a process according to an embodiment of the present invention.

Please refer to FIG. 3, which illustrates a schematic diagram of a process 30 according to an embodiment of the present invention. The process 30 is utilized for reducing power consumption for a UE of a wireless communications system, and can be compiled into the resource control program code 220. The process 30 includes the following steps:

Step 300: Start.

Step 302: Stop monitoring a first and a second common channel and clear configuration corresponding to the first and the second common channel when a connection setup message is received for configuring the UE to enter a CELL_DCH state.

Step 304: End.

According to the process 30, the embodiment of the present invention stops monitoring the first and the second common channel to receive downlink packets and control signals, and furthermore clears the configuration corresponding to the first and the second common channel, when the UE receives the connection message for entering the CELL_DCH state. Preferably, the first and second common channels are respectively HS-DSCH for receiving the downlink packets and HS-SCCH for receiving the control signals. The connection setup message is preferably an RRC CONNECTION SETUP message related to an RRC connection establishment procedure capable of configuring the UE to the CELL_PCH, URA_PCH, CELL_FACH or CELL_DCH state.

When the RRC CONNECTION SETUP message configures the UE to enter the CELL_DCH state after the completion of the RRC connection establishment procedure, the UTRAN no longer configures HS-DSCH with old parameters when the UE enters the CELL_DCH state. In this situation, the embodiment of the present invention stops HS-DSCH and HS-SCCH reception and clears the corresponding configuration used before the UE enters CELL_DCH state, so as to avoid radio resource waste caused by continued monitoring of HS-DSCH and HS-SCCH. Compared to the present invention, after entering CELL_DCH state, the UE of the prior art continues HS-DSCH and HS-SCCH reception even though the UTRAN transmits no data on HS-DSCH, thereby wasting power and system resources.

In conclusion, the embodiment of the present invention require the UE to deactivate the HS-DSCH reception in the CELL_FACH state when entering CELL_DCH sate irrespective of allocation of HS_DSCH, so as to prevent the UE from power consumption and resource waste.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for enhancing a resource utility rate for a user equipment, hereinafter called UE, of a wireless communications system, the method comprising:
   sending a radio resource control (RRC) connection request message;
   starting receiving data and control signaling via a high speed downlink shared channel (HS-DSCH) and a shared control channel for HS-DSCH (HS-SCCH) after sending the RRC connection request message; and
   stopping receiving data and control signaling, during a RRC connection establishment procedure via the HS-DSCH and the HS-SCCH and clearing configuration corresponding to the HS-DSCH and the HS-SCCH in response to reception of a RRC connection setup message for configuring the UE to enter a Cell Dedicated Channel (CELL_DCH) state.

2. A communications device used in a wireless communications system for enhancing a resource utility rate, the communications device comprising:
   a control circuit for realizing functions of the communications device;
   a central processing unit coupled to the control circuit for executing a program code to operate the control circuit; and
   a memory coupled to the central processing unit for storing the program code;
   wherein the program code executes instructions for:
      sending a radio resource control (RRC) connection request message;
         starting receiving data and control signaling via a high speed downlink shared channel (HS-DSCH) and a shared control channel for HS-DSCH (HS-SCCH) after sending the RRC connection request message; and
      stopping receiving data and control signaling, during a RRC connection establishment procedure via the HS-DSCH and the HS-SCCH and clearing configuration corresponding to the HS-DSCH and the HS-SCCH in response to reception of a RRC connection setup message for configuring the UE to enter a Cell Dedicated Channel (CELL_DCH) state.

* * * * *